(12) United States Patent
Wang et al.

(10) Patent No.: US 9,143,439 B2
(45) Date of Patent: Sep. 22, 2015

(54) SYSTEM AND METHOD FOR CLUSTER LINK AGGREGATION CONTROL IN A NETWORK ENVIRONMENT

(75) Inventors: Xun Wang, Milpitas, CA (US); Diheng Qu, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 44 days.

(21) Appl. No.: 13/555,717

(22) Filed: Jul. 23, 2012

(65) Prior Publication Data
US 2014/0025736 A1    Jan. 23, 2014

(51) Int. Cl.
G06F 15/16    (2006.01)
H04L 12/709    (2013.01)
H04L 12/715    (2013.01)
G06F 17/30    (2006.01)
H04L 12/729    (2013.01)
H04L 12/703    (2013.01)

(52) U.S. Cl.
CPC ............. *H04L 45/245* (2013.01); *H04L 45/46* (2013.01); *G06F 17/30705* (2013.01); *H04L 45/125* (2013.01); *H04L 45/28* (2013.01); *Y02B 60/33* (2013.01)

(58) Field of Classification Search
None
See application file for complete search history.

(56) References Cited

U.S. PATENT DOCUMENTS

| | | | |
|---|---|---|---|
| 6,298,061 B1 | 10/2001 | Chin | |
| 6,687,751 B1* | 2/2004 | Wils et al. | 709/230 |
| 7,274,694 B1* | 9/2007 | Cheng et al. | 370/389 |
| 7,457,256 B2* | 11/2008 | Ivaldi et al. | 370/256 |
| 7,738,366 B2* | 6/2010 | Uddenberg et al. | 370/229 |
| 7,940,661 B2* | 5/2011 | Ervin et al. | 370/232 |
| 2007/0002826 A1* | 1/2007 | Bennett et al. | 370/351 |
| 2007/0008982 A1* | 1/2007 | Voit et al. | 370/401 |
| 2010/0290472 A1 | 11/2010 | Raman et al. | |
| 2010/0290473 A1 | 11/2010 | Enduri et al. | |
| 2011/0032945 A1* | 2/2011 | Mullooly et al. | 370/401 |
| 2013/0194914 A1* | 8/2013 | Agarwal et al. | 370/225 |
| 2013/0336324 A1* | 12/2013 | Solomon | 370/392 |
| 2013/0339475 A1* | 12/2013 | Kataria et al. | 709/217 |

FOREIGN PATENT DOCUMENTS

| | | |
|---|---|---|
| EP | 2075974 | 1/2009 |
| WO | WO2014/018253 | 1/2014 |

OTHER PUBLICATIONS

Cisco Systems, Inc., "IEEE 802.3ad Link Bundling," © 2006, 2007, 28 pages; http://www.cisco.com/en/US/docs/ios/12_2sb/feature/guide/sbcelacp.html.
IEEE, "Standard for Local and Metropolitan area networks—Link Aggregation," IEEE Std 802.1AX™, Nov. 3, 2008, 162 pages.
(Continued)

*Primary Examiner* — Mohamed Ibrahim
*Assistant Examiner* — James Fiorillo
(74) *Attorney, Agent, or Firm* — Patent Capital Group

(57) ABSTRACT

A method is provided in one example and includes receiving a request message from a first network element using an out-of-band control link. The request message includes a request to bundle a first port associated with the first network element into a channel group associated with a cluster. The cluster includes a plurality of clustered network elements. The method further includes determining a status of the first port with respect to the channel group, and sending a reply message to the first network element using the out-of-band control link. The reply message indicates the determined status of the first port of the first network element.

16 Claims, 11 Drawing Sheets

(56) References Cited

OTHER PUBLICATIONS

Seaman, Mick, "Link Aggregation Control Protocol," Rev. 4.0, Mar. 7, 1999, 39 pages; www.ieee802.org/3/ad/public/mar99/seaman_1_0399.pdf.

Wikipedia, "Link Aggregation," [retrieved and printed from the Internet Jun. 12, 2012], 7 pages; http://en.wikipedia.org/wiki/Link_aggregation.

PCT Oct. 17, 2013 International Search Report and Written Opinion of the International Searching Authority from International Application No. PCT/US2013/049780.

Spijker, Rick Van T, "Multiple Systems Link Aggregation Control Protocol," bq-rick-van-t-spijker-mslacp-final-31-05-2010-1104; IEEE Draft; IEEE-SA, Piscataway, NJ USA, vol. 802.1, May 31, 2010.

PCT Feb. 5, 2015 International Preliminary Report on Patentability and Written Opinion of the International Searching Authority from International Application No. PCT/US2013/049780.

* cited by examiner

SYSTEM AND METHOD FOR CLUSTER LINK AGGREGATION CONTROL IN A NETWORK ENVIRONMENT

TECHNICAL FIELD

This disclosure relates in general to the field of communications and, more particularly, to a system and a method for providing cluster link aggregation control in a network environment.

BACKGROUND

Link aggregation combines multiple network connections in parallel in order to increase throughput of a network beyond that which may be provided by a single connection. It may also be used to provide redundancy in case one or more of the connections fails. Link aggregation offers an inexpensive way to set up a high-speed network that transfers much more data than any one single port or device can deliver. Link Aggregation Control Protocol (LACP) is a communication protocol that provides for controlling the bundling of several physical ports of a network device together to form a single logical channel.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving a request message from a first network element using an out-of-band control link. The request message includes a request to bundle a first port associated with the first network element into a channel group associated with a cluster. The cluster includes a plurality of clustered network elements. The method further includes determining a status of the first port with respect to the channel group, and sending a reply message to the first network element using the out-of-band control link. The reply message indicates the determined status of the first port of the first network element. In more particular embodiments, the reply message further includes a port priority of the first port. In more particular embodiments, the status of the first port is determined as either bundled with the channel group or in a standby status. In more particular embodiments, determining the status of the first port includes determining whether the status of the first port is bundled or in standby based on at least one of load balance within the cluster and maximum bundled port count.

In still more particular embodiments, the method further includes receiving an indication that the first port is non-operative over the out-of-band control link, and triggering a bundle balancing procedure in response to receiving the indication. In more particular embodiments, the bundle balancing procedure includes sending an unselect message to a second network element of the plurality of clustered network elements using the out-of-band control link. The unselect message indicates to the second network element to change a status of a second port of the second network element from a bundled status to a standby status (where the term 'status' encompasses any type of level, characterization, mode, etc.). In still more particular embodiments, the bundle balancing procedure includes sending a select message to the first network element using the out-of-band control link. The select message indicates to the first network element to change a status of third port of the first network element from a standby status to a bundled status. In still more particular embodiments, the out-of-band control link uses a cluster link aggregation protocol in which the cluster link aggregation protocol includes a standard link aggregation control protocol and a cluster specific link aggregation control protocol.

EXAMPLE EMBODIMENTS

Figure 1:
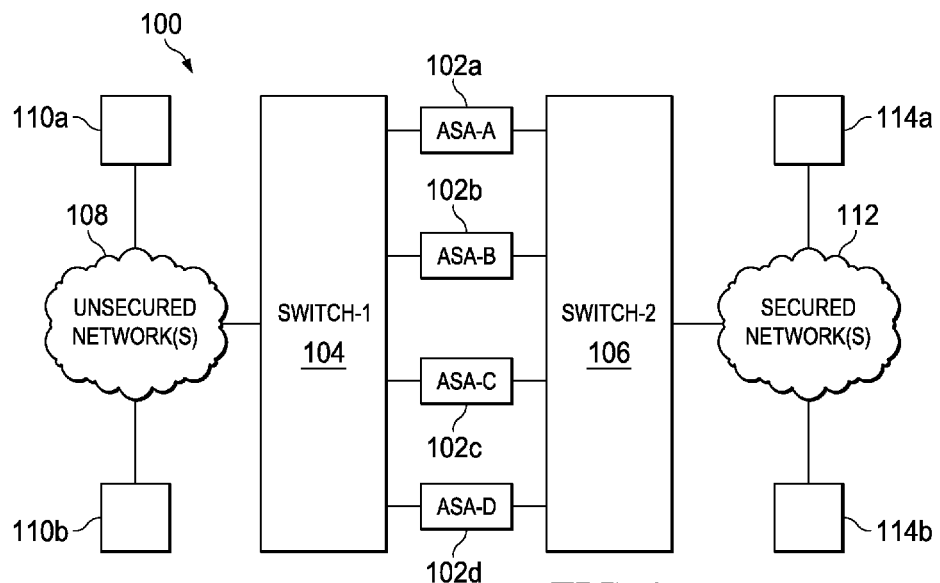
FIG. 1 is a simplified block diagram of an embodiment of a communication system 100 for providing cluster link aggregation control in a network environment.

Turning to FIG. 1, FIG. 1 is a simplified block diagram of an embodiment of a communication system 100 for providing cluster link aggregation control in a network environment. The communication system 100 of FIG. 1 includes a first network security device 102a, a second network security device 102b, a third network security device 102c, and a fourth network security device 102d. In a particular embodiment, network security devices 102a-102d are each an adaptive security appliance (ASA) indicated in FIG. 1 as ASA-A 102a, ASA-B 102b, ASA-C 102c, and ASA-D 102d, respectively. In a particular embodiment, the adaptive security appliance (ASA) is a network security device provided by Cisco Systems, Inc., which provides network security services such as firewalling, intrusion prevention, VPN, content security, unified communications, remote access, antivirus, antispam, antiphishing, universal resource locator (URL) blocking and filtering, and content control.

Although the particular embodiment illustrated in FIG. 1 shows the use of adaptive security devices (ASAs), it should be understood that, in other embodiments, any network security device may be used. In still other embodiments, the network devices may not necessarily be network security devices but may instead be any network element for which cluster link aggregation may be desired. As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information.

Each of ASA-A 102a, ASA-B, 102b, ASA-C 102c, and ASA-D 102d has a first set of network ports coupled to a first switch (switch-1) 104 and a second set of network ports coupled to a second switch (switch-2) 106. Switch-1 104 is in further communication with unsecured network(s) 108. Endpoint device 110a and endpoint device 110b are in communication with unsecured network(s) 108. Switch-2 106 is in further communication with secured network(s) 112. Endpoint device 114a and endpoint device 114b are in communication with secure network(s) 112. One or more of ASA-A 102a, ASA-B 102b, ASA-C 102c, and ASA-D 102d provide security services to endpoint devices 114a-114b in communication with secured network(s) 112 from network traffic received from unsecured network(s) 108 such as traffic originating from endpoint devices 110a-110b. ASA-A 102a, ASA-B 102b, ASA-C 102c, and ASA-D 102d form a cluster having one or more links aggregated together to provide greater throughput, resiliency, and/or other benefits of link aggregation that may be provided by a single ASA. This allows for cluster link aggregation control to be implemented in environments such as those depicted by FIG. 1 as will be further described herein.

Endpoint devices 110a-110b and 114a-114b can be associated with clients, customers, or end users wishing to initiate a communication in communication system 100 via some network. The term 'endpoint device' is inclusive of devices used to initiate a communication, such as a receiver, a computer, a set-top box, an IRD, or any other device, component, element, or object capable of initiating voice, audio, video, media, or data exchanges within communication system 100. One or more of endpoint devices 110a-110b and 114a-114b may also be inclusive of a suitable interface to the human user, such as a display, a keyboard, a touchpad, a remote control, or other terminal equipment. One or more of endpoint devices 110a-110b and 114a-114b may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

Unsecured network(s) 108 and secured network(s) 112 represent a series of points or nodes of interconnected communication paths for receiving and transmitting packets of information that propagate through communication system 100. Unsecured network(s) 108 and secured network(s) 112 offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Unsecured network(s) 108 and secured network(s) 112 may implement a UDP/IP connection and use a TCP/IP communication language protocol in particular embodiments of the present disclosure. However, unsecured network(s) 108 and secured network(s) 112 may alternatively implement any other suitable communication protocol for transmitting and receiving data packets within communication system 100.

In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

Figure 2:
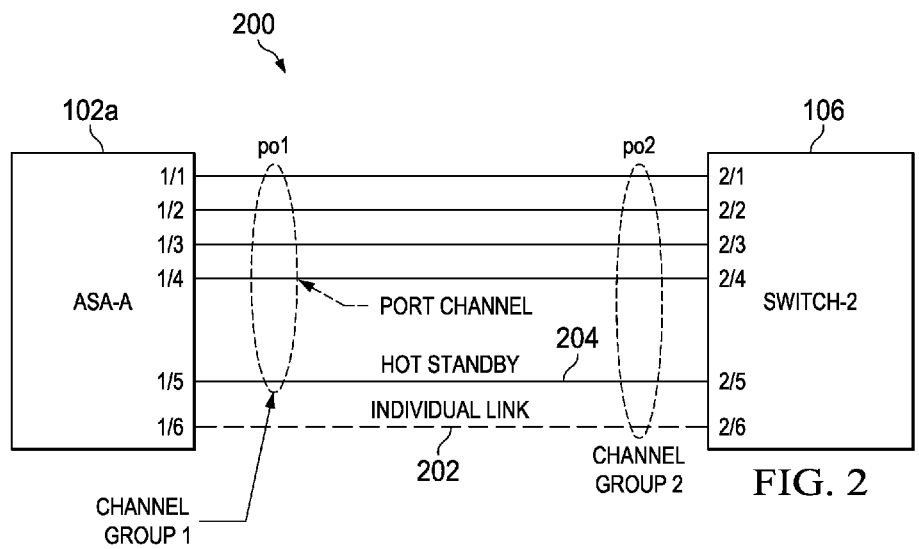
FIG. 2 is a simplified block diagram of a link aggregation arrangement between a single adaptive security appliance (ASA) and a switch.

For purposes of illustrating certain example techniques of communication system 100, it is important to understand the communications that may be traversing the network. The following foundational information may be viewed as a basis from which the present disclosure may be properly explained. Referring now to FIG. 2, FIG. 2 is a simplified block diagram of a link aggregation arrangement 200 between a single ASA-A 102a and switch-2 106. The illustration of FIG. 2 provides further information regarding link aggregation in an unclustered situation so that the embodiments further described herein which include clustering maybe more clearly understood. In FIG. 2, ASA-A 102a includes physical Ethernet interfaces 1/1, 1/2, 1/3, 1/4, 1/5, and 1/6. Switch-2 106 includes physical Ethernet interfaces 2/1, 2/2, 2/3, 2/4, 2/5, and 2/6. Physical Ethernet interface 1/1 of ASA-A 102a is coupled to physical Ethernet interface 2/1 of switch-2 106. Physical Ethernet interface 1/2 of ASA-A 102a is coupled to physical Ethernet interface 2/2 of switch-2 106, physical Ethernet interface 1/3 of ASA-A 102a is coupled to physical Ethernet interface 2/3 of switch-2 106, physical Ethernet interface 1/4 of ASA-A 102a is coupled to physical Ethernet interface 2/4 of switch-2 106, physical Ethernet interface 1/5 of ASA-A 102a is coupled to physical Ethernet interface 2/5 of switch-2 106, and physical Ethernet interface 1/6 of ASA-A 102a is coupled to physical Ethernet interface 2/6 of switch-2 106.

The IEEE 802.3ad standard supports aggregation of physical Ethernet interfaces to form a logical Ethernet link, also referred to as an Etherchannel or port-channel, using Link Aggregation Control Protocol (LACP). Aggregation of physical Ethernet interfaces using LACP provides greater bandwidth, high availability, and auto-reconfiguration. Without LACP, an Etherchannel can only be formed by static configuration. A channel group is a group that represents a user's intent to aggregate a set of interfaces either explicitly or using channeling protocols. The channel group is hence a container that comprises of all the ports that the user has added. In the example of FIG. 2, ASA-A 102a is configured with channel group 1 with members 1/1, 1/2, 1/3, 1/4, and 1/5 and switch 2 105 is configured with channel group 2 with members 2/1, 2/2, 2/3, 2/4, 2/5, and 2/6. A port channel is a logical interface representing a set of interfaces that are operationally aggregated into a single logical forwarding interface. The port channel interface aggregation characteristic is determined by the configurationally and operational parameters. A port channel interface is created out of some channel group. In FIG. 2, there is one port channel interface associated with channel group 1 on ASA-A 102*a* as pot, and one port channel interface associated with channel group 2 on switch-2 106 as pot.

A suspended link is a link that cannot be aggregated due to misconfiguration of operational or administrative parameters. Examples are links whose ports on two end systems have different port speeds or channel modes. An individual link is typically a link that is allowed to participate in aggregation on one end system, but is not allowed on the other end system. Individual links will continue to work as a normal 802.3 link. In FIG. 2, link 202 between port 1/6 on ASA-A and port 2/6 on switch-2 106 works as individual link when LACP protocol is running and only one end system includes it in a channel-group. A hot-standby link is a link that can be aggregated operationally but is not included in aggregation due to limitations of a systems aggregation capability. For example, in FIG. 2, assume ASA-A is configured in such a manner so as to support a maximum of four links in an aggregation although it can allow up to sixteen links to be configured in the channel group. Accordingly, a set of four links can be aggregated to form a logical port channel interface within the channel group. The remaining links become standby links which can join the port channel if one or more aggregated links fail. In FIG. 2, link 204 between port 1/5 on ASA-A 102*a* and port 2/5 on switch-2 106 is a standby link operating as part of channel groups 1 and 2.

Clustering allows multiple network devices to provide much higher throughput than that provided by a single network device. To support clustering in accordance with various embodiments, links between multiple network devices are aggregated into one communication channel. In ASA clustering, links between multiple ASAs to a switch are aggregated in one Etherchannel, referred to as a span-cluster Etherchannel.

Link Aggregation Control Protocol (LACP), as defined in IEEE 802.3ad, is a link-level control protocol that allows the dynamic negotiation and establishment of Link Aggregation Groups (LAGs). The challenge for clustering is that LACP is defined to run between two devices only according to IEEE 802.3ad or IEEE 802.1ax. Both IEEE 802.3-2005 and IEEE 802.1ax state that "Link Aggregation, as specified in this clause, does not support the following: . . . n) Multipoint Aggregations: The mechanisms specified in this clause do not support aggregations among more than two Systems." On ASA clusters, without the cluster link aggregation protocol (CLACP) of various embodiments described herein, when multiple ASAs' ports need to be aggregated in Etherchannels, the Etherchannels have to be formed with static configuration without LACP. The consequence is a traffic "black hole" on a cluster when there is link/port failure.

Figure 3:
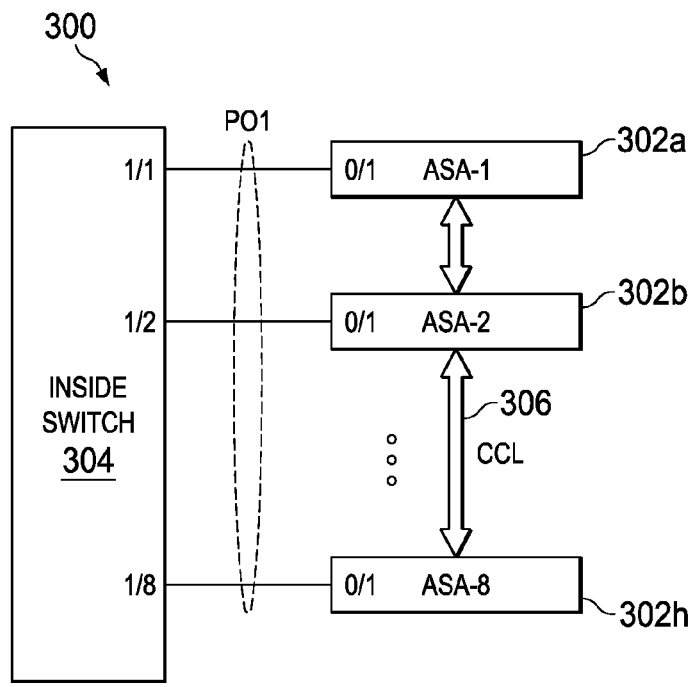
FIG. 3 illustrates an example of a cluster connected with a switch using an Etherchannel in which the cluster link aggregation control protocol of various embodiments is not implemented.

FIG. 3 illustrates an example of a cluster 300 connected with a switch using an Etherchannel in which the cluster link aggregation control protocol of various embodiments is not implemented. In the example of FIG. 3, eight ASAs, ASA1 302*a*-ASA8 302*h*, form a cluster connected with an inside switch 304 using Etherchannel po1 as a firewall on a stick topology. The eight ASAs, ASA1 302*a*-ASA8 302*h* communicate with one another over a cluster control link (CCL) 306. Without a cluster link aggregation protocol as described in various embodiments herein, Etherchannel po1 between inside switch 304 and ASA1 302*a* to ASA8 302*h* is statically configured. If port 0/1 on ASA1 302*a* is still in a link up status but functionally fails, inside switch 304 will still send traffic over the link between its port 1/1 and port 0/1 of ASA1 302*a*. This will cause packet loss and port 0/1 on ASA1 302*a* becomes a traffic "black hole."

Furthermore, on an ASA some ports, especially optical ports, do not shutdown even when an ASA reloads. For example, if ASA1 in FIG. 3 is reloaded, port 0/1 will turn up before the ASA image is fully reloaded. Inside switch 304 will send traffic to port 0/1 if Etherchannel is not configured with a cluster link aggregation protocol as described herein, which makes it a "black hole" port. In order to resolve such issues caused by port/link failure or ASA reload in Etherchannel on clusters, various embodiments described herein provide for a link aggregation protocol support in clustering. In one or more embodiments, a cluster link aggregation protocol (CLACP) module is provided on an ASA and may provided one or more of the following functionalities: supporting a link aggregation control protocol over multiple ASA units in a cluster, provide multi-chassis Etherchannel with auto-configuration on an ASA cluster and make clustered ASAs able to inter-operate with standard LACP devices as one ASA in logic, provide Etherchannel re-configuration with traffic black-hole avoidance and load-balancing at both link and device level during link failure or device failure, provide a cluster link aggregation protocol (CLACP) application programming interface (API) to a cluster control plane to notify Etherchannel link status changes and provide health monitoring, and/or provide CLACP recovery/redundancy between ASA units in the case of a master unit leaving the cluster.

Figure 4:
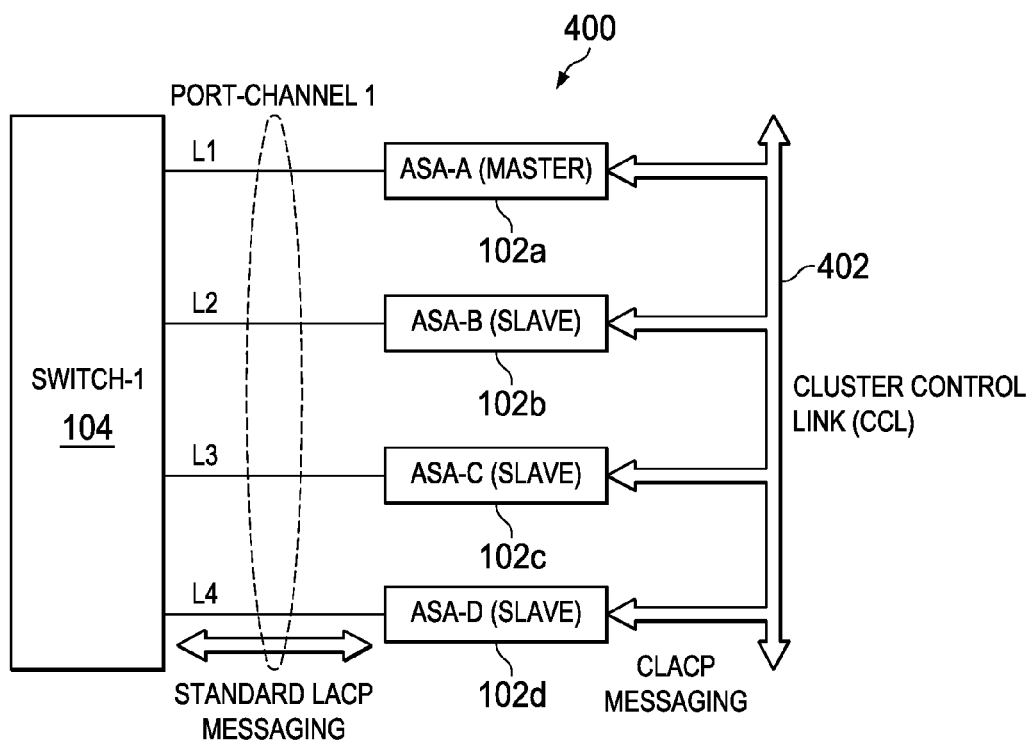
FIG. 4 illustrates an embodiment of a cluster connected to a switch in which a cluster link aggregation control protocol is implemented.

Referring now to FIG. 4, FIG. 4 illustrates an embodiment of a cluster 400 connected to a switch-1 104 in which a cluster link aggregation control protocol is implemented. Cluster 400 includes ASA-A 102*a*, ASA-B 102*b*, ASA-C 102*c*, and ASA-D 102*d*. ASA-A 102*a* is connected to switch-1 104 by link L1, ASA-B 102*b* is connected to switch-1 104 by link L2, ASA-C 102*c* is connected to switch-1 104 by link L3, and ASA-D 102*d* is connected to switch-1 104 by link L4. ASA-A 102*a*, ASA-B 102*b*, ASA-C 102*c*, and ASA-D 102*d* are configured as a cluster in which links L1-L4 are aggregated together into a single port channel 1, also referred to as a span-cluster Etherchannel. Switch-1 104 communicates with ASA-A 102*a*, ASA-B 102*b*, ASA-C 102*c*, and ASA-D 102*d* over links L1-L4 using standard link aggregation control protocol (LACP) messaging. The cluster 400 further includes a cluster control link (CCL) 402 connected to each of ASA-A 102*a*, ASA-B 102*b*, ASA-C 102*c*, and ASA-D 102*d*. Cluster control link 402 is an out-of-band link between ASA-A 102*a*, ASA-B 102*b*, ASA-C 102*c*, and ASA-D 102*d* that is a dedicated link for communication between the cluster units ASA-A 102*a*, ASA-B 102*b*, ASA-C 102*c*, and ASA-D 102*d*. ASA-A 102*a*, ASA-B 102*b*, ASA-C 102*c*, and ASA-D 102*d* communicate with each other over the CCL 402 using cluster link aggregation control protocol (CLACP) messaging. In one or more embodiments, the cluster link aggregation protocol (CLACP) includes a standard link aggregation control protocol (LACP) combined with a cluster specific link aggregation control protocol.

In at least one embodiment, IEEE standard 802.3ad or 802.1ax LACP is employed on switch-1 104 and a cluster link aggregation control protocol as further described herein is employed on each of ASA-A 102*a*, ASA-B 102*b*, ASA-C 102*c*, and ASA-D 102*d* on the ASA cluster. In a particular embodiment, CLACP is a superset of standard LACP and follows standard LACP in link aggregation negotiating/synchronization with switch-1 104 by exchanging standard Link Aggregation Control Protocol Data Unit LACP Data Units (LACPDUs) with switch-1 104 over links L1-L4 which are in the same channel-group. CLACP implements an extended protocol for link aggregation control between ASA units within the cluster, by exchanging CLACP control messages via cluster messaging APIs over Cluster Control Link (CCL) 402.

One of the ASAs is designated as the master of cluster 400 and the other ASAs of the cluster are designated as slaves. In the particular embodiment illustrated in FIG. 4, ASA-A 102*a* is designated as the cluster master, and each of ASA-B 102*b*, ASA-C 102*c*, and ASA-D 102*d* is designated as a slave. The cluster master, ASA-A 102*a*, is tasked with making decisions regarding link aggregation for the whole cluster 400. The cluster master unit ASA-A 102*a* makes link aggregation decisions for all units of cluster 400, and distributes the results/status to slave units ASA-B 1-2*b*, ASA-C 102*c*, and ASA-D 102*d*. Each slave unit ASA-B 1-2*b*, ASA-C 102*c*, and ASA-D 102*d* maintains link aggregation results/status related to its local ports, and is therefore able to forward traffic belonging to the Etherchannel without involvement of the cluster master ASA-A 102*a*. The master unit, ASA-A 102*a*, maintains link aggregation status of the whole cluster.

From the perspective of switch-1 104, (1) LACPDUs sent from CLACP device is same as standard LACPDU; and (2) CLACP behaves as LACP does when operating on a single device. Hence, CLACP is compatible with standard LACP devices. Within the cluster 400, CLACP is a distributed protocol and link aggregation status is distributed among cluster members while the cluster master manipulates LACP link aggregation parameters and makes decisions regarding link aggregation for the whole cluster. Furthermore, in various embodiment CLACP is not only resilient to port/link failure, but also cluster unit failure. Also, in various embodiments CLACP is able to balance the bundles (active links) among units in clustering. Further, in various embodiments CLACP can be reused by other device clustering solutions on the top of their cluster messaging implementations.

Figure 5:
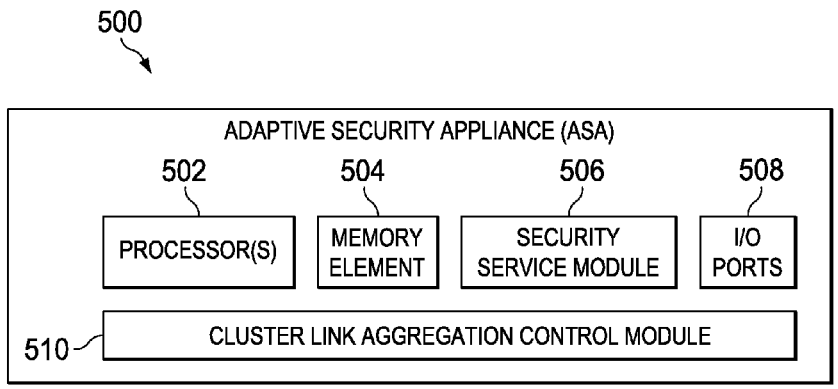
FIG. 5 illustrates an embodiment of an adaptive security appliance (ASA) according to one embodiment.

Referring now to FIG. 5, FIG. 5 illustrates an embodiment of an adaptive security appliance (ASA) 500 according to one embodiment. ASA 500 includes one or more processor(s) 502, a memory element 504, a security service module 506, I/O ports 508, and cluster link aggregation control module 510. Processor(s) 502 is configured to execute various tasks of ASA 500 as described herein and memory element 504 is configured to store data associated with ASA 500. Security service module 506 is configured to provide the various security services offered by ASA 500. Cluster link aggregation control module 510 is configured to implement the cluster link aggregation control protocol (CLACP) as further described herein.

In one implementation, ASA 500 is a network element that includes software to achieve (or to foster) the cluster link aggregation control protocol operations, as outlined herein in this Specification. Note that in one example, each of these elements can have an internal structure (e.g., a processor, a memory element, etc.) to facilitate some of the operations described herein. In other embodiments, these cluster link aggregation control protocol operations may be executed externally to this elements, or included in some other network element to achieve this intended functionality. Alternatively, ASA 500 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Cluster Link Aggregation Control Protocol (CLACP)

Various embodiments of the CLACP described herein allow links among multiple ASAs to be aggregated together to form a Link Aggregation Group (LAG) (or Etherchannel or port-channel), such that a Media Access Control (MAC) client can treat the Etherchannel as if it were a single link. For example, in the embodiment of FIG. 2 switch-1 104 will view links L1-L4 with ASA-A 102*a*, ASA-B 102*b*, ASA-C 102*c*, and ASA-D 102*d* as a single link. This allows aggregation of multiple ASAs as a virtual and much-powerful ASA, with increased bandwidth, linearly incremental bandwidth, increased availability, load sharing and deterministic behavior. The CLACP process is distributed over ASAs in a cluster, while the cluster master's CLACP module takes the control of link aggregation across the cluster.

Whereas standard LACP aggregates links which have the same capability and which terminate in the same two end systems, the CLACP of various embodiments described herein provides for aggregation of links on multiple ASAs in a same cluster into one Etherchannel in which the ASA cluster is treated as one logic end system from a device external to the ASA cluster.

In a particular embodiment, the CLACP includes a number of link aggregation parameters used by the ASAs to achieve the correct aggregation of a cluster while maintaining capability with a standard LACP used by a connected device such as a switch. Within a particular embodiment of the CLACP, the link aggregation parameters of a local system are prefixed by 'Actor' and link aggregation parameters of a remote system are prefixed by 'Partner'. In one or more embodiments, the CLACP imposes special requirements and functionality for these LACP parameters used for cluster aggregation as compared with standard LACP as further described below. A Link Aggregation Group Identifier (LAG ID) parameter represents an identity of the aggregation as understood by both end systems of the Etherchannel or port channel. In at least one embodiment, the LAG ID is comprised of an Actor's system identifier (SI), a port operational key (PK) assigned to this aggregation, and a port identifier (PI), as well as the Partner's SI, PK, and PI. All the members of a port channel will have the same LAG ID associated with them as further described herein. Accordingly, although links in CLACP may be over different ASAs, they will share the same LAG ID if they are in one Etherchannel or port channel.

The LAG ID is symbolic representation of the port channel or the link aggregation group. When a link in a channel-group is not aggregated into the port-channel, it is not in the aggregation group and it has its individual LAG ID. In a particular embodiment LAG ID is represented as [(S, K, P), (T, L, Q)], where:

S and T are system Identifiers of the two end systems such that S is numerically smaller than T. In an ASA cluster, the cluster is one logic/virtual end system in the LAG. K and L are operational keys that are assigned by systems S and T, respectively. P and Q are port identifiers assigned by the systems S and T respectively. In a particular embodiment, the P and Q values will be zero when the members are operating as part of a port channel interface. In at least one embodiment, the port identifiers are used only in cases in which links are individual and not aggregated into a port channel.

A system identifier parameter is used to identify an end system. In one or more embodiments, every end system will have a 64-bit wide system identifier that will be used in the LACP protocol. In particular embodiments, the system identifier is formed by concatenating a 16-bit system priority and a 48-bit system MAC address of the port-channel. A system priority parameter identifies a priority of the system. In one or more embodiments, systems participating in LACP have a user configurable system priority. In a particular embodiment, the allowable range is 1 to 65535 (16-bits), with the higher number signifying lower priority. In more particular embodiments, a default value for the system priority is 32768 or 0x8000. In at least one embodiment, the CLACP of various embodiments have the same priority parameter convention as that for LACP.

A system MAC parameter identifies the MAC ID or device ID associated with the system. In LACP for a single (non-clustered) ASA, the system MAC is the lowest numbered physical member interface's burnt-in MAC address and is not user configurable. In an ASA cluster as provided for by CLACP, in at least one embodiment, each ASA unit will still have one such LACP system MAC for Etherchannels that are not part of a span-cluster. For span-cluster Etherchannels employing CLACP, all ASAs share the same system MAC. If one of the ASA's system MAC is used as the CLACP system MAC, the CLACP system MAC could potentially be made dynamic due to a particular ASA' unit's leaving or joining the cluster. To prevent this, in at least one embodiment the default CLACP system MAC is an automatically generated CLACP system MAC. In one or more embodiments, the default CLACP system MAC may be generated in a manner similar to that of an automatically generated failover MAC address. In a particular embodiment, a user may be allowed to configure a virtual CLACP system MAC for the whole cluster using a user interface such as a command line interface (CLI). In accordance with various embodiments of the CLACP, both auto-generated and user-configured system MAC are only created on the cluster master and be updated to the slave units. When a new slave unit joins the cluster, the newly joined unit will receive the system MAC from the cluster master. In a particular embodiment, the first two types of auto-generated system MACs have values of 0xA6 and 0x00 in order to distinguish from an existing ASA MAC address that may have been automatically generated. The 0xA6 value indicates that the MAC is a local administrated individual MAC address as the CLACP MAC address is not used as MAC address in traffic transmission.

In one or more embodiments, an individual cluster unit's port MAC address will be used as the source address in the LACP Data Units (LACPDU) from that unit port. In a particular embodiment, 01-80-C2-00-00-02, the slow_protocols_multicast_address defined in IEEE 802.3ad, will be used as the destination MAC address for all LACPDU exchanges.

As a logic interface, an Etherchannel also needs a MAC address. In single ASA Etherchannels, the default Etherchannel MAC address is the lowest numbered physical interface's built-in MAC address among all physical interfaces bundled in the Etherchannel. This Etherchannel MAC address may be dynamic due to an interface leaving or joining the Etherchannel. Alternately, the Etherchannel MAC address can also be assigned administratively as the virtual MAC address. For an ASA cluster, all ASA units in one span-cluster Etherchannel will share one Etherchannel MAC for the Etherchannel. In a particular embodiment, the lowest numbered physical interface's built-in MAC address in a channel group on the Master unit will be the shared Etherchannel MAC by default. In still other embodiment, a user may configure a virtual MAC address for the span-cluster Etherchannel to ensure that the MAC address is not impacted by interfaces or ports leaving or joining in the cluster.

The port operation key (PK) parameter as defined for example in IEEE 802.1ax (called Port Capability Identification in IEEE 802.3ad) is decided by an administrative key and an operational key of a port. The administrative key is the key configured by the management for the port (or interface), and the operational key is the key value assigned to the port by the LACP. In a particular embodiment, the administrative key is a 16-bit number used by the LACP to manage aggregation. In a particular embodiment, On an ASA the channel-group ID will be used as the administrative key. In a particular embodiment, the operational key is a 16-bit integer assigned to a port signifying that it can aggregate with all the other ports that are assigned the same operational key in a same Etherchannel. In one or more embodiments, the operational key assignment is not user configurable. On ASA, by default, the operational key matches the administrative key (i.e., channel-group ID whenever there is only one port-channel interface formed in a channel group). However, CLACP provides an API to the cluster control plane to change the port operational key to dynamically add a link to a cluster channel group (and the corresponding Etherchannel) or alternately remove a link from a channel group.

The port identification parameter identifies a port or an interface in a system. In a particular embodiment the port identifier is a 32-bit unique number assigned to a port (or an interface) in a system. In a more particular embodiment, the port identifier is formed by combining a 16-bit port-priority and 16-bit port number assigned to an interface. In one or more embodiments, the port identifier is used as a port aggregation priority for forming aggregations. Ports are considered for active use in an aggregation starting with the port that has highest port aggregation priority in the system and working downward through an ordered list of the port identifiers. In one or more embodiments, the port identifier is set in all LACP Data Units (LACPDUs) sent out of the port.

The port priority parameter identifies a priority of a port or interface. In one or more embodiments, port priority is used by CLACP selection logic within cluster link aggregation control module 510 in order to determine which ports should be activated and which should be placed in a hot-standby mode. For example, it may be necessary to place one or more ports in a hot-standby mode when there are hardware or software limitations on the maximum number of links allowed in a port-channel. In one or more embodiments, the port priority parameter is user configurable such that a user can configure port priority for all the interfaces that have LACP enabled. In a particular embodiment, the allowable range of the port priority is 1 to 65535, in which a higher number signifies a lower priority. In a more particular embodiment, a default value of the port priority is 32768 or 0x8000. In some cluster link aggregation control protocol (CLACP) configurations, particular links are placed in an active mode to achieve the best or the most desirable load balance between ASAs. In some embodiments, the assignment of port priority can either rely on smart configuration by a customer, or the port priorities may be adjusted by the CLACP.

The port number parameter serves as a unique identifier for a port in LACP. For a cluster, all ASA units will have same port-numbers based on the same interface ID. In order to distinguish all of the ASA ports in the cluster, CLACP reserves a portion of the port number for this purpose. In a particular embodiment, first 6 bits of a 16-bit port number for a unit ID is reserved so that port number overlap between ASAs may be avoided. With a reservation of 6 bits, up to 64 units in one ASA cluster can be supported. The remaining 10 bits are still enough for 1024 ports on a single ASA.

In LACP, LACP parameters are important in Etherchannel auto-configuration and negotiations. In standard LACP, each port in a channel group can be in one of four possible channel modes. In 'Active' mode, ports initiate LACPDU exchange with their peer on the other end system and periodically send out LACPDU to inform the peer of any updates. Passive mode ports do not initiate LACPDU, but upon receiving from its peer, they also start initiating exchange with their peer. 'Passive' mode is useful in scenarios where it is not clear as whether the remote port supports LACP. When the port is not configured as a member of channel-group, it is in 'Off' mode. Static configure is 'On' mode. In various embodiments of the CLACP described herein, 'Active' mode is required in order to use CLACP for span-cluster Etherchannel.

In various embodiments, CLACP manipulates some LACP parameters such as system ID, port ID, and port priority when needed. The master unit controls the CLACP parameters for the whole cluster in most cases. For example, in one or more embodiments, all units within the cluster use same system-id as decided by the master unit. In this way, the cluster of units can be viewed as a single device by network devices outside of the cluster. In another example, when the master unit needs to move a specific hot-standby port on a specific unit to a bundled state, it increases the port-priority of that port. While with standard LACP the port number is a function of a hardware slot and port number, in various embodiments of CLACP, the unit ID is embedded dynamically into a port ID of a newly joined cluster unit.

CLACP Messaging

Various embodiments of CLACP provide for additional messages that are added to an existing link aggregation control protocol such as LACP. These CLACP messages are sent from a master unit to a slave unit or from a slave unit to a master unit over the cluster-messaging link such as a cluster control link (CCL). In particular embodiments, CLACP messaging are over the clustering messaging and/or Remote Procedure Call (RPC) services, independent of clustering implementation platform. In particular embodiments, the CLACP messages include, but are not limited to:

(a) a Request Bundle message sent from a slave unit to a master unit in which a slave unit requests the master unit to bundle a port of the slave unit;

(b) a Select message sent from the master unit to the slave unit in which the master unit selects a slave port to bundle specifying to the slave unit that a certain port is to be selected to be the bundled in the link aggregation;

(c) an Unselect message sent from the master unit to the slave unit in which the master unit unselects a bundled port on a slave unit by specifying to the slave unit that a certain port is to be unbundled and moved to a standby status;

(d) a Handle Standby message sent from the master unit to the slave unit in which the master unit instructs a slave unit to handle a particular standby port by changing a hot-standby port to active; and (e) a Status Update message sent from the slave unit to the master unit in which the slave unit reports link status changes to the master unit to keep the master united updated about the status of links.

In a particular embodiment, the above-described CLACP messages may take the following form:

```
RequestBundle(unit_id,agg_id, port_id);
Select(unit_id, agg_id, port_id);
Unselect(unit_id, agg_id, port_id);
HandleStandby(unit_id, agg_id, port_id); and
StatusUpdate(unit_id, agg_id, port_id).
```

The parameter unit_id represents the unit ID of the slave unit, agg_id represents an aggregation ID identifying the cluster such as a Link Aggregation Group Identifier (LAG ID), and the port_id represents the port ID of the specified port.

Distributed CLACP Processes on a Cluster

Hybrid CLACP State Machines

In standard LACP, there are four state machines running on each interface: a receive state machine, a periodic state machine, a Mux state machine and a transmit state machine. In addition, core logic called selection logic is involved in interactions among these state machines and among all interfaces. The receive machine maintains partner information, recording protocol information from LACPDUs sent by remote partner(s). Received information is subject to a timeout, and if sufficient time elapses the receive machine will revert to using default partner information. The periodic machine establishes the desire of the participants to exchange LACPDUs periodically to maintain an aggregate, and how often periodic transmission should take place. The Mux state machine attaches the physical port to an aggregate port using the selection Logic to choose an appropriate port, and turns the distributor and collector for the physical port on or off as required by protocol information. The transmit state machine formats and transmits LACPDUs as required by the periodic state machine and by other machines if the partner's view of the actor's state is not current. In addition, it imposes maximum transmission rate limitations on LACPDUs. The selection logic chooses the aggregate port for the physical port. It determines the Link Aggregation Group Identifier (LAG ID) for the physical port, and finds the aggregate port with the same LAG ID.

On an ASA cluster, each ASA unit still runs four state machines on each interface and maintains port state and port channel information of its own ports. However, slave ASA units do not run selection logic for span-cluster Etherchannels. Instead, they would update the cluster master ASA about any CLACP state change of ports that participate in span-cluster channel-groups. The cluster master ASA maintains the LACP state of all ASAs' ports that participate in a span-cluster channel-group, and only the cluster master runs the selection logic for span-cluster channel-groups under CLACP. The cluster master selects links for port aggregation, forms link aggregation and sends aggregation decisions to the slave units if the related ports are not its own. Only the cluster master accepts global CLACP configuration from a user interface, and controls system parameters of the CLACP. In one or more embodiments, the cluster master also can change the operational parameters of ports on slave units. Each ASA unit processes incoming LACPDU by its own, but it updates the master when an LACPDU changes the link aggregation status.

Distributed Link Aggregation Status for Traffic Transmission

The cluster master unit makes decisions regarding link aggregation for all units in a cluster and distributes the results/status to the slave units of the cluster. Each slave unit maintains link aggregation results/status related to its local ports and is able to forward traffic belong to the Etherchannel without involvement of cluster master unit. The master unit maintains link aggregation status of the whole cluster. The link aggregation status related to a particular unit is distributed to that unit, so that the unit's CLACP module 510 can build a port-channel appropriately with its port-channel specific information (i.e., list of active members, hot-standby members and any other related information on the unit). Each unit further maintains this information. When the cluster master makes any link aggregation change on span-cluster port-channels, it will update the related slave unit. The slave unit receives the update and maintains the link aggregation state on its ports. On each individual unit, only these link aggregation status information items are needed to form the port channel and deal with data transmission after the port channel is formed. Without a link status change, link aggregation change, or cluster unit change, data transmission in port channels should not need to involve the cluster master's CLACP process.

Distributed Operational Compatibility Check

One LACP standard process is to take actions on any port operational parameters, such as speed or channeling mode, changes for link aggregation. Operational parameters are attributes that are required for ports belonging to the same channel-group to aggregate into a port channel. For ports to aggregate into a port channel, all operational parameters for all the member ports and the port channel itself have to either be the same, or compatible. If a port transitions from being compatible to non-compatible due to a configuration change, then the port is suspended although it still remains as part of the channel-group. On ASA, a compatibility check will typically be needed when a port changes link speed, duplex or mode. In an ASA cluster, because all units are identical in interface characteristics and configuration, CLACP does not check compatibility between units. For multiple ports on a same ASA, the existing LACP compatibility check will be sufficient.

LAG Membership Monitoring

In at least one embodiment, LAG port membership monitoring is conducted following standard LACP procedures. If the monitoring process detects a change in configuration that materially affects the link membership in its current LAG, then it may be appropriate to remove the link from its current LAG. The individual ASAs in the cluster run LAG membership monitoring, and updates the cluster master of any change. Furthermore, in order to let cluster's peer, such as a switch, at the other end of an Etherchannel notice one ASA unit's leaving from the cluster, such as because the ASA crashes, more quickly, a LACPDU is generated by CLACP and sent from the reloading ASA unit to the switch during traceback dumping. Otherwise, when ASA ports are down during ASA reboot, switch ports will detect this when sending traffic to it. In various embodiments, CLACP includes a process to handle a unit leaving the cluster both gracefully and ungracefully. In both cases, ports of the leaving unit in all span-cluster Etherchannels will be removed from the Etherchannels and the master will send messages to the remaining units to change hot-standby ports to active on the unit if they have any hot-standby ports. In this process, slave units have priority to handle hot-standby ports and this will leave the master with a lighten load to mitigate overloading of the cluster master.

Link Failure Recovery

When an active link fails and the cluster master unit is still in the cluster, the master unit changes the link aggregation, selects a hot-standby link if there is one, and updates remaining slaves about recovered link aggregation status.

Unit Failure Recovery

When a cluster slave unit leaves from the cluster gracefully, the master unit will receive a notice and a CLACP status update will be sent to the other remaining units by the master. All span-cluster Etherchannels will be shutdown on the leaving unit, and a LACPDU will be sent to the connected switch so that is can remove corresponding links form its link aggregation bundling. When an ASA unit crashes, LACPDU are still sent to the switch during crashdump, and the link aggregation update will be handled by the master unit and hot-standby ports on all remaining units have a chance to be moved to active status by the master unit. Even if a LACPDU is not sent, the switch will notice a port down within several seconds using LACP. Accordingly, timeout based cluster membership and health monitoring will detect ungraceful unit leave within the cluster. If the master leaves or fails, after a new master is elected, the new master collects information from slaves to rebuild the complete status/information of link aggregation and select hot-standby link(s) to active if there are any.

Failure Recovery with Interface Health-Check

Various embodiments of CLACP can reconfigure multiple span-cluster Etherchannels during failure to avoid traffic black holes. This is performed by CLACP supported cluster interface health-check and CLAPC load-balance control. In an interface health-check, a unit (master or slave) has less interfaces than other units will be temporarily removed (disabled) from the cluster. These interfaces include the Etherchannel interface. After a certain timeout period, the disabled unit will attempt to join the cluster. If the unit can bring up as many interfaces as other units, it can join the cluster successfully.

Figure 6:
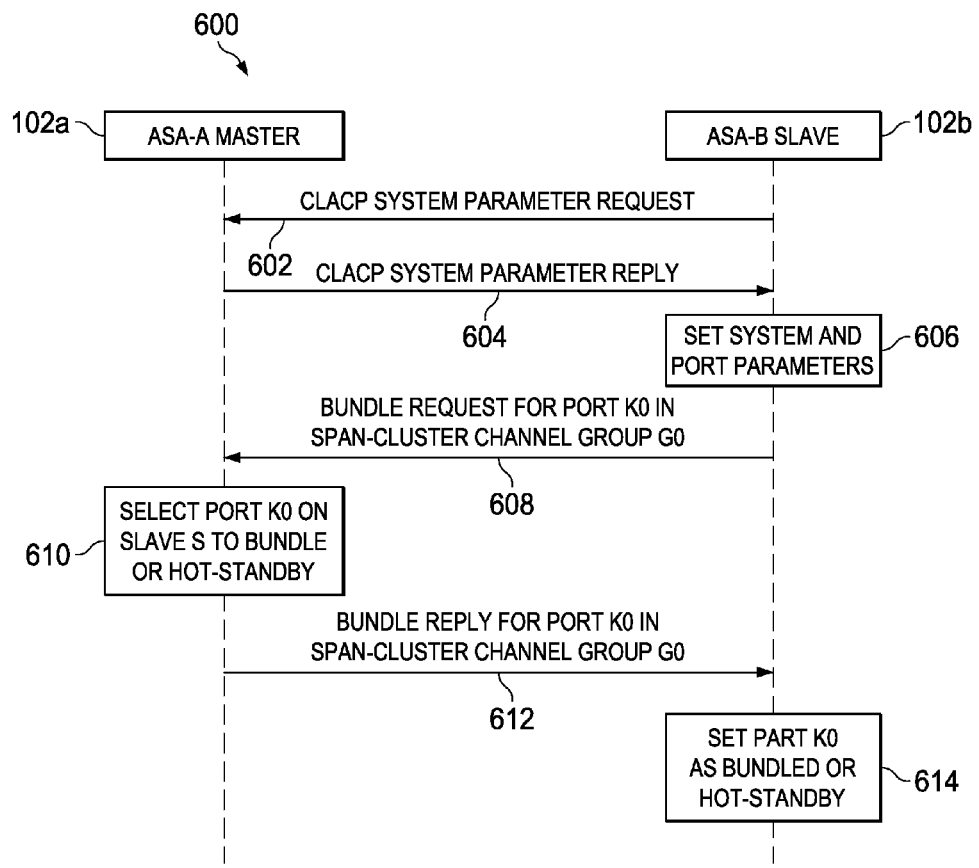
FIG. 6 is a simplified flow diagram illustrating one embodiment of a procedure for a slave unit to join a cluster.

Referring now to FIG. 6, FIG. 6 is a simplified flow diagram illustrating one embodiment of a procedure 600 for a slave unit to join a cluster. In the embodiment illustrated in FIG. 6, a procedure 600 is described for ASA-B 102b acting as a slave unit to join a cluster having ASA-A 102a acting as a master unit 102a. In 602, ASA-B sends a CLACP System Parameter Request to ASA-A 102 over the Cluster Control Link (CCL). The CLACP System Parameter Request is a message sent to the master of a cluster, in this instance ASA-A 102a, requesting the CLACP system parameters associated with the cluster. In 604, ASA-A 102a sends a CLACP System Parameter Reply message to ASA-B 102b over the CCL. The CLACP System Parameter Reply message includes the CLACP system parameters associated with a cluster such as a channel-group associated with the cluster. In 606, ASA-B 102b sets the CLACP system parameters and port parameters conveyed by the CLACP System Parameter Reply message, and enables the LACP and CLACP processes on all member ports of the span-cluster channel groups of the cluster. In a particular embodiment illustrated in FIG. 6, a port K0 of ASA-B 102b in a channel-group G0 is ready for possible bundling within the cluster group.

In 608, ASA-B 102b sends a Bundle Request message for port K0 to ASA-A 102a over the CCL. The Bundle Request message is a request for the master unit to either set the indicated port in the indicated channel group as either bundled or hot-standby. In 610, ASA-A 102a as the master unit decides to select port K0 on slave unit ASA-B 102b to either bundle port K0 or alternately set port K0 as a hot-standby considering load balance within the cluster and maximum bundled port count. In 612, ASA-A 102a sends a Bundle Reply message for port K0 in span-cluster channel group G0 using the CCL. The Bundle Reply message indicates the status of the port in the span-cluster channel group as determined by the master unit. In at least one embodiment, the Bundle Reply message indicates a port priority of the port. In 614, ASA-B 102b sets port K0 as either bundled or hot-standby. In addition, ASA-B 102b sets the port priority of K0 according to the Bundle Reply message. Although not illustrated in FIG. 6, the operations of 608-614 are repeated for all member ports and all span-cluster channel groups for ASA-B 102b. For example, ASA-A 102a may next ready a port K1 in channel group G1 and send a Bundle Request message regarding port K1 to ASA-A 102a.

Figure 7:
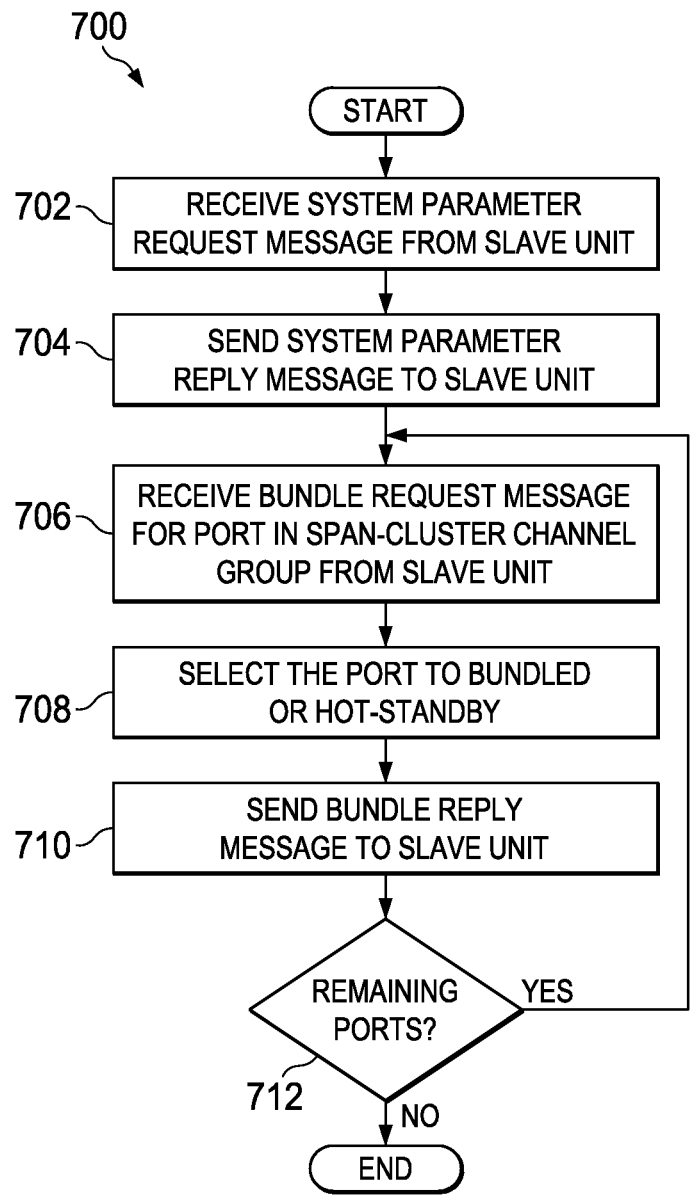
FIG. 7 is a simplified flowchart illustrating an embodiment of a procedure for determining port bundle status of ports of a slave unit by a master unit.

Referring now to FIG. 7, FIG. 7 is a simplified flowchart illustrating an embodiment of a procedure 700 for determining port bundle status of ports of a slave unit by a master unit. In 702, the master unit receives a system parameter request message from a slave unit that is joining a cluster to which the master unit is the master using the CCL. In 704, the master unit sends a system parameter reply message including the CLACP cluster system parameters to the slave unit using the CCL. In response to receiving the system parameter reply message, the slave unit sets the CLACP cluster system parameters within itself and sends a bundle request for a particular port of the slave unit in a particular channel group. In 706, the master unit receives a bundle request message for a particular port of the slave unit in a particular span-cluster channel group from the slave unit using the CCL. In 708, the master unit selects the port for either a bundled state if the port is to be bundled within the cluster or a hot-standby state if the port is to be placed in a hot-standby mode. In 710, the master unit sends a bundle reply message to the slave unit using the CCL. The bundle reply message includes an indication regarding whether the port should be bundled or set to hot-standby. In response to receiving the bundle reply message, the slave unit sets the port to either bundled or hot-standby as indicated by the bundle reply message. In 712, it is determined whether there are any remaining ports on the slave unit to be sent. If there are remaining ports to be set on the slave unit, the procedure returns to 706 in which the master unit receives a new bundle request message for the next port on the slave unit. If there are no remaining ports on the slave unit for which a status needs to be set for the cluster, the procedure ends.

Bundle Balance in CLACP

Bundle balance with the CLACP of various embodiments provides for operations to configure all cluster units to have equal or closest to equal of ports to be bundled, so that all units can take a balanced load within a span-cluster Etherchannel. Furthermore, bundle balance is dynamic so that it can provide failure recovery which maintains the best bundle balance after link or unit failure. Further, bundle balance can also rebalance a bundle when a unit leaves or joins the cluster. Still further, when the cluster is connected to a multi-chassis switching system such as Cisco Virtual Switch System (VSS) and/or virtual PortChannel (vPC) through a span-cluster Etherchannel, bundle balance is achieved from both the cluster and switch perspective so that each switch in, for example, VSS/vPC has the same or closest number to the same of bundled linked with each cluster unit.

When more links are configured into one channel-group than a predetermined LACP link aggregation limitation CLACP uses a load-balance algorithm to choose the links used in link aggregation in order to achieve best or best available load balance. In order to balance traffic among cluster units during link failure, the algorithm re-aggregates links among remaining links and devices, so that device-level resource can be used most efficiently after failure recovery and traffic is re-balanced as much as possible to achieve the best traffic balancing among units and links. Further description of the load balancing procedures of the CLACP is further described herein.

Figure 8:
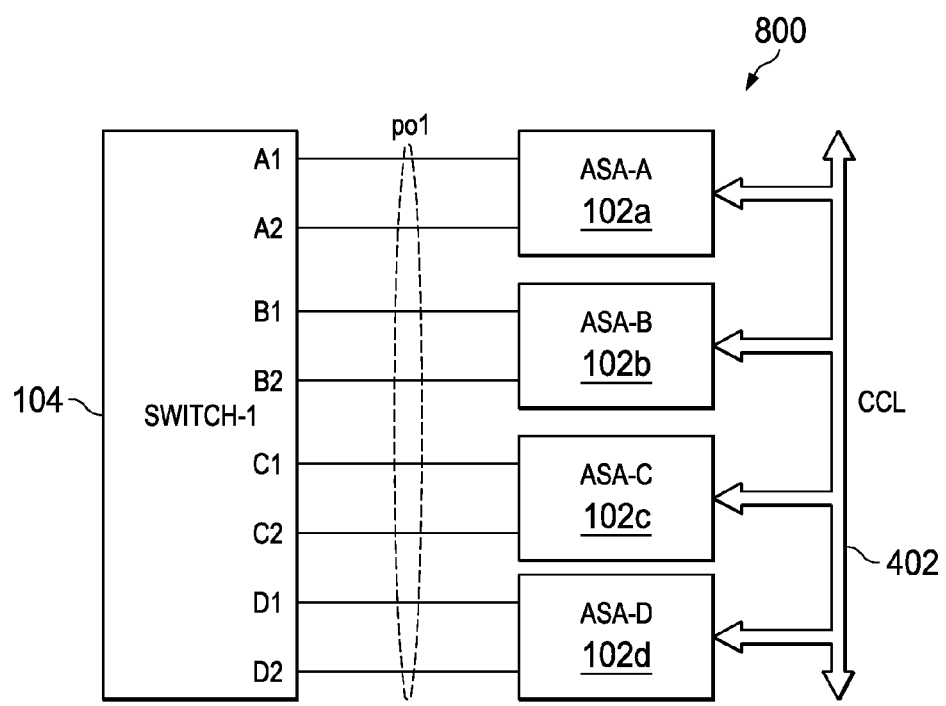
FIG. 8 illustrates a simplified block diagram of an embodiment of a span-cluster Etherchannel cluster using bundle balancing.

In order to provide better device-level load balance in clustering and/or multi-chassis Etherchannels, it is desirable to have bundled/active ports (and hot-standby ports) evenly distributed between units in the cluster and/or Multi-chassis system. Referring now to FIG. 8, FIG. 8 illustrates a simplified block diagram of an embodiment of a span-cluster Etherchannel cluster 800 using bundle balancing. In FIG. 8, there are four cluster units, ASA-A 102a, ASA-B 102b, ASA-C 102c, and ASA-D 102d, connected to switch-1 104 with a span-cluster Etherchannel pot. Each cluster unit has two links in the channel-group, such that ASA-A 102a has links A1 and A2, ASA-B 102b has links B1 and B2, ASA-C 102c has links C1 and C2, and ASA-D 102d has links D1 and D2. If the maximum number of bundled/active ports is four, the best balanced bundling would be one port (e.g., A1, B1, C1, and D1) on each unit in a bundled state, and the other port (A2, B2, C2, and D2) in hot-standby state. In this way, each cluster unit can take same responsibility of forwarding traffic in the span-cluster Etherchannels. This is referred to as bundle balance. Although the present discussion is direct to bundle balancing between switches and ASAs, bundle balance may not only apply to switches and ASAs, but may also apply for other types of device clustering or multi-chassis environments.

Automatic Balance of Bundled Ports

Still referring to FIG. 8, in the cluster 800 of FIG. 8 in which there are eight ports in the channel group but the maximum bundle is four, in order to evenly distribute bundled ports among four cluster units, a administrator might be able to manually configure the appropriate LACP port-priority on ASA ports by configuring one port on each ASA with a high LACP port-priority, and the other port with a low LACP port-priority. However, static manual configuration cannot guarantee balanced bundling when there is a link or unit failure and it is not adaptive to unit join or leave from the cluster. For example, when link B1 fails, in order to maintain bundling balance, it is desirable that link B2 moves from hot-standby to bundled state automatically. Various embodiments of CLACP provide bundle balance operations to achieve automatic balancing of bundled ports. With CLACP, bundle balance is performed automatically and the bundling ports are distributed evenly, or as close to evenly as possible, among cluster units so that all units can potentially have equal or the closest to equal traffic load within a span-cluster Etherchannel.

Distributed Failure Recovery

Link failure is handled by both the cluster master unit and the slave units. When a link fails, other active links in the cluster will take over its traffic temporarily, until the cluster master selects one appropriate hot-standby link into the link aggregation if there are any available. Cluster slave unit failure is handled by the Cluster master unit. When the cluster master fails, all slave units keep traffic forwarding without interruption and no more links can be bundled until a new master is elected. Device-level load-balance is sustained after failure recovery.

Figure 9:
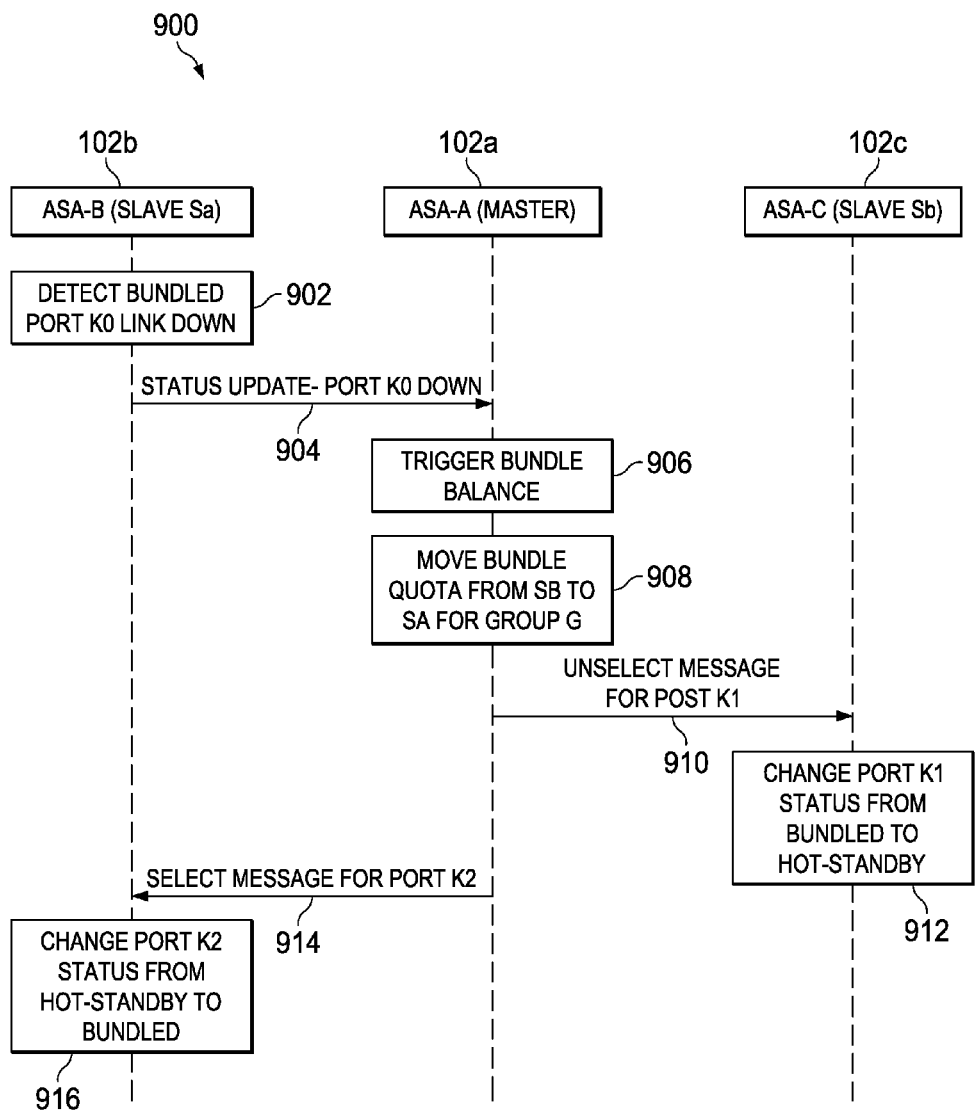
FIG. 9 is a simplified flow diagram illustrating one embodiment of a procedure for bundle balancing of a cluster after link failure in a unit.

Referring now to FIG. 9, FIG. 9 is a simplified flow diagram illustrating one embodiment of a procedure 900 for bundle balancing of a cluster after link failure in a unit. In the embodiment illustrated in FIG. 9, a cluster includes ASA-A 102a acting as the cluster master unit, ASA-B 102b acting as a slave unit Sa, and ASA-C 102c acting as a slave unit Sb. In 902, ASA-B 102b (slave Sa) detects that a bundled port K0 in span-cluster channel group G has a status of link down indicating that the link is no longer up and/or non-operative. In 904, ASA-B 102b (slave Sa) sends a status update message about port K0 being down to ASA-A 102a (master) using the CCL. In 906, a bundle balance operation or procedure is triggered in ASA-A 102a (master) in response to receiving the status update message. In 908, bundle logic within ASA-A 102a (master) decides to move one bundle quota from ASA-C 102c (slave Sb) to ASA-B 102b (slave Sa) for span-cluster channel group G by (1) unselecting a bundled port K1 on ASA-C 102c (slave Sb) and (2) selecting hot-standby port K2 to bundled on ASA-B 102b (slave Sa). In 910, ASA-A 102a (master) sends an unselect message to ASA-C 102c (slave Sb) for port K1. In 912, ASA-C 102c (slave Sb) changes the status of port K1 from bundled to hot-standby and sets the port priority of K1 accordingly. In 914, ASA-A 102a (master)

sends a select message to ASA-B (slave Sa) for port K2 to change the status of port K2 from hot-standby to bundled. In 916, ASA-A 102a (master) changes the status of port K2 from hot-standby to bundled and sets the port priority of K2 accordingly.

Bundle Balancing in Multiple Dimensions

Figure 10:
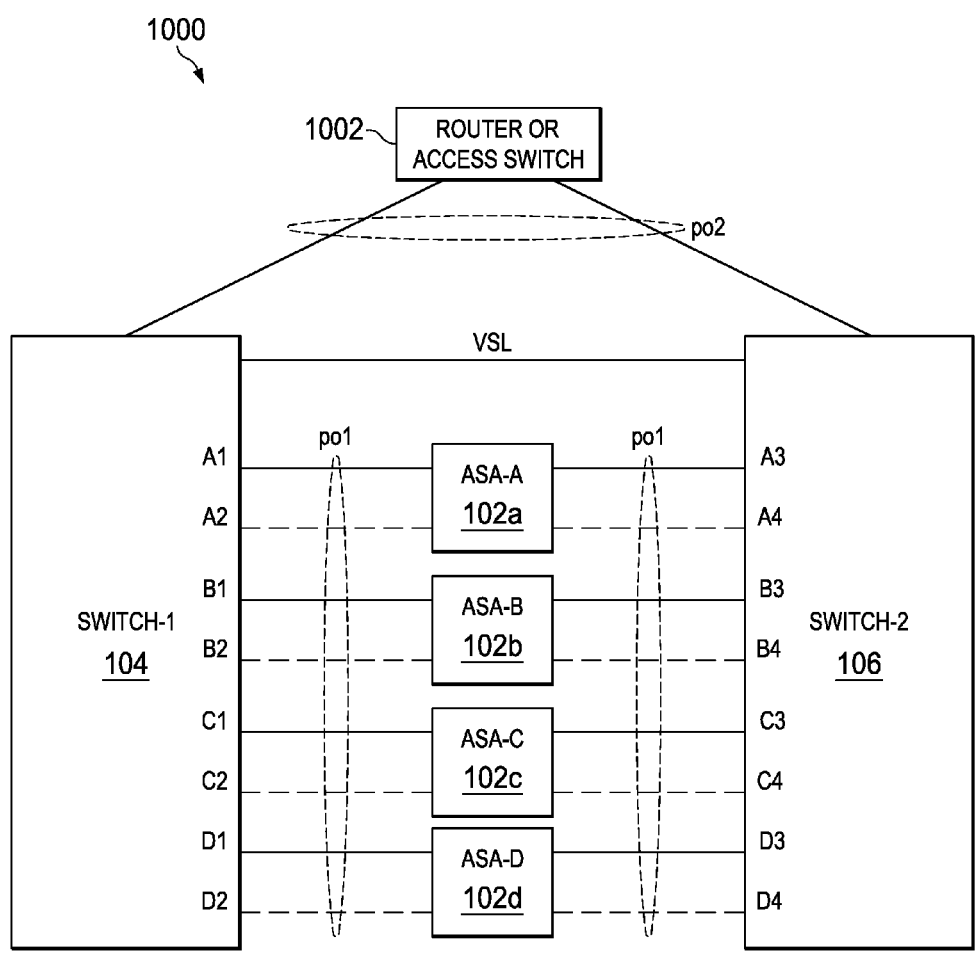
FIG. 10 illustrates a simplified block diagram of an embodiment of a span-cluster Etherchannel cluster using multi-dimensional bundle balancing.

Referring now to FIG. 10, FIG. 10 illustrates a simplified block diagram of an embodiment of a span-cluster Etherchannel cluster 1000 using multi-dimensional bundle balancing. In the embodiment of FIG. 10, the cluster 1000 include four units, ASA-A 102a, ASA-B 102b, ASA-C 102c, and ASA-D 102d connected through port channel p01 with a virtual switching system (VSS) switch pair including switch-1 104 and switch-2 106. Each ASA has two ports connected to switch-1 104 and two ports connected to switch-2 106. ASA-A 102a is connected to switch-1 104 via links A1 & A2, and switch-2 106 via links A3 & A4. ASA-B 102b is connected to switch-1 104 via links B1 & B2, and switch-2 106 via links B3 & B4. ASA-C 102c is connected to switch-1 104 via links C1 & C2, and switch-2 106 via links C3 & C4. ASA-D 102d is connected to switch-1 104 via links D1 & D2, and switch-2 106 via links D3 & D4. In the embodiment of FIG. 10, there are a total of sixteen links in po1 and the maximum LACP bundle is eight. In FIG. 10, dashed lines between the ASAs and the switches represent a standby status of the link and solid line represents a bundled port or active link status. Switch-1 104 and Switch-2 106 are coupled by a Virtual Switch Link (VSL). Switch-1 104 and Switch-2 106 are further connected to a router or access switch 1002 through port channel p02.

Bundle balance achieves the best balance when the bundling is balanced in three dimensions: a) all ASAs have same or closet number of bundled ports; b) all switches have same or closet number of bundled ports; c) all ASAs have same or closet number of bundled ports connected with each switch, and all switches have same or closet number of bundled ports connected with each ASA. In the embodiment of FIG. 10, a best balanced bundling is to bundle links A1, A3, B1, B3, C1, C3, D1, and D3, and to leave all other links in hot-standby state. In this configuration, each ASA takes the same responsibility in forwarding traffic in po1 (dimension a), each switch takes the same responsibility (dimension b and dimension c). Such a configuration provides better resilience in a case in which one switch fails. In particular embodiments, the best bundle balance requires that the physical connections between cluster units and switches are symmetric (i.e., each ASA has same amount of links connected to each switch).

Bundle Balance Recovery During Link and/or Unit Failure

Figure 11A:
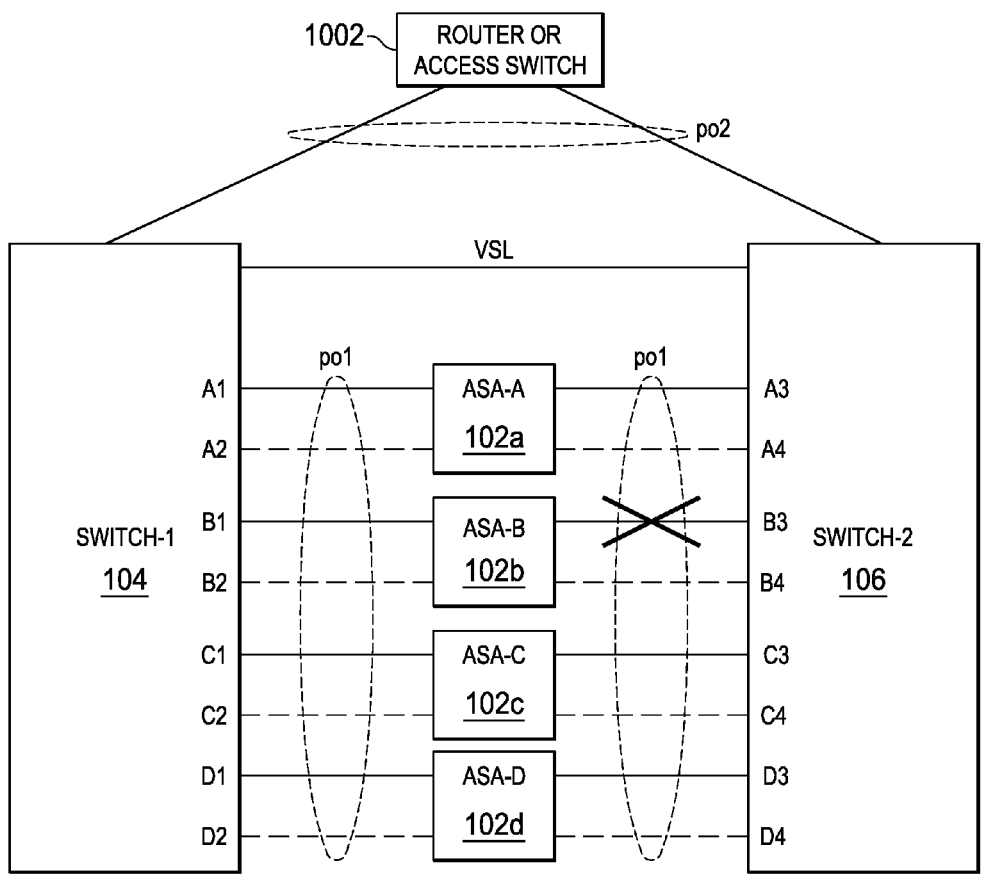
FIGS. 11A-11D illustrate simplified block diagrams of an embodiment of an example of bundle balance recovery during link and/or unit failure.
Figure 11B:
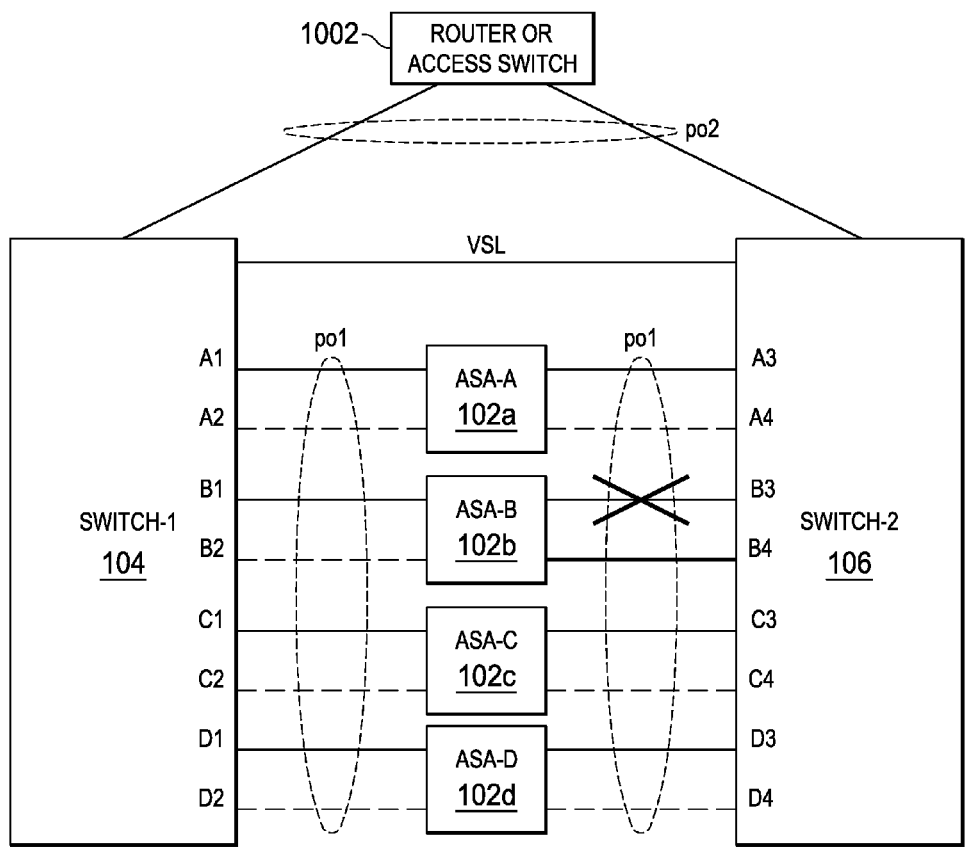
Figure 11C:
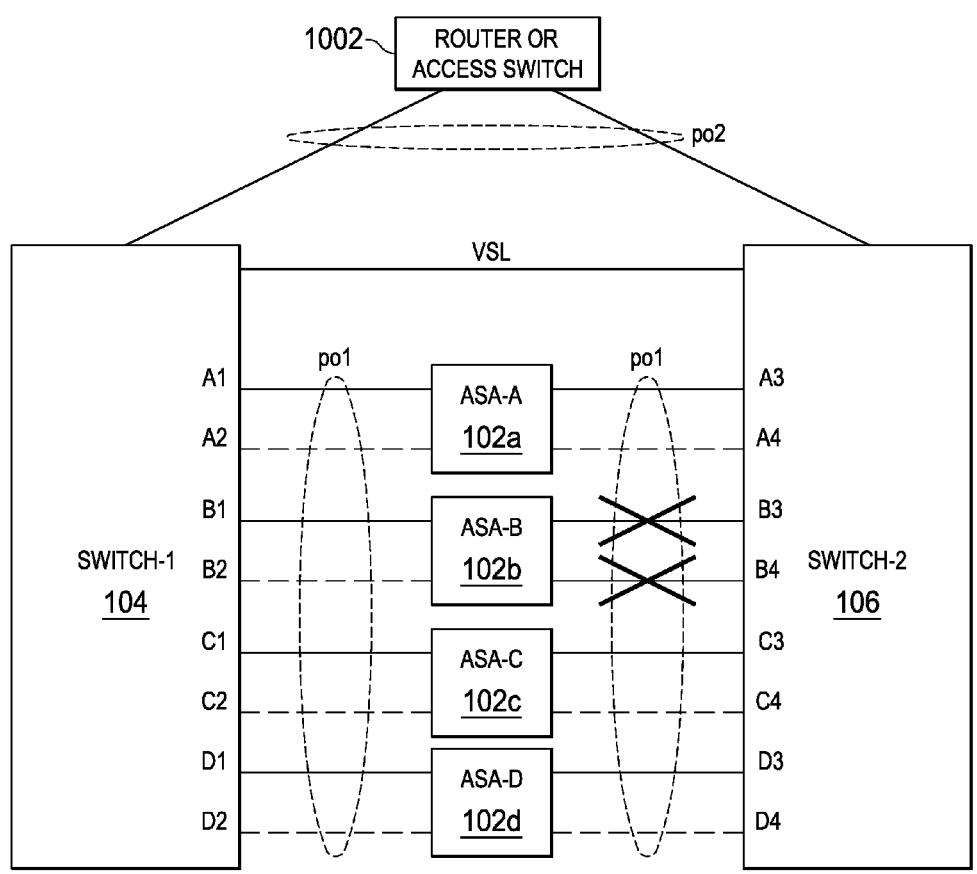
Figure 11D:
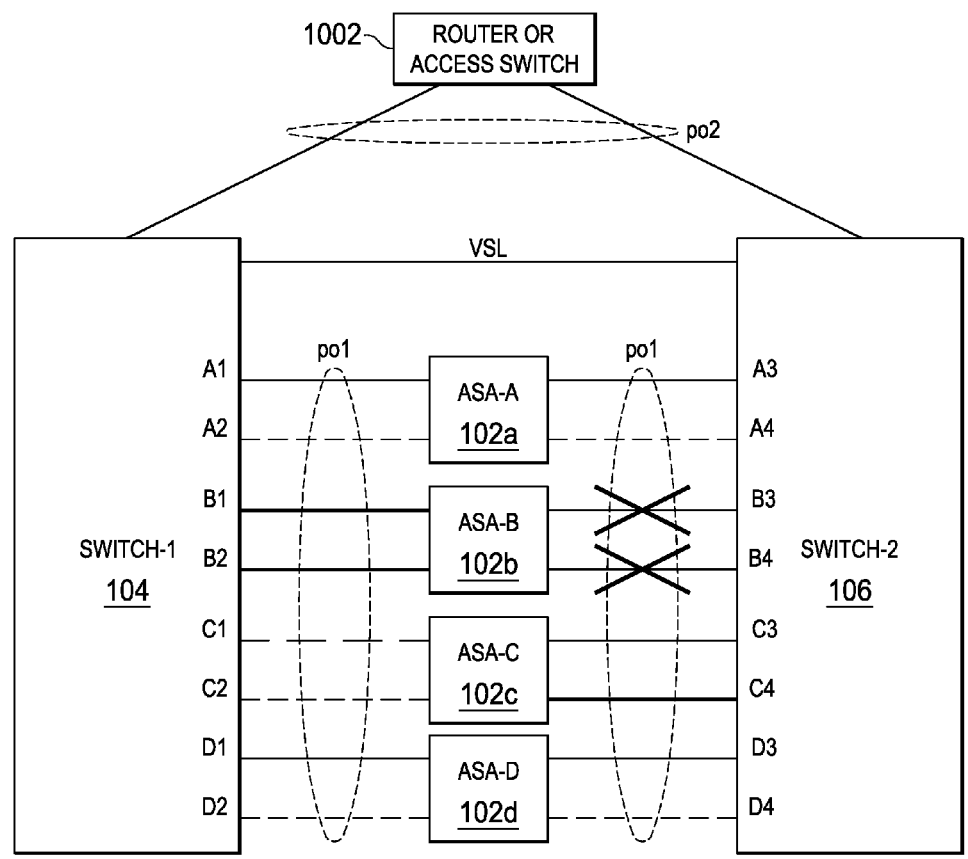

Referring now to FIGS. 11A-11D, FIGS. 11A-11D illustrate simplified block diagrams of an embodiment of an example of bundle balance recovery during link and/or unit failure. When there is a link and/or unit failure, the bundle balance of various embodiments makes a best-effort recovery to maintain device-level balance. In some cases, the recovery only involves the unit where the failure happened. For example, if originally A1, A3, B1, B3, C1, C3, D1 and D3 are bundled (see FIG. 10), when B3 is down (see FIG. 11A), a best effort recover is to move B4 from standby to bundled state (see FIG. 11B). However, in some cases, the recover needs to involve multiple cluster units. For example, if both B3 and B4 are down (see FIG. 11C), the best recover needs to involve another cluster unit. A possible best effort recovery is to bundle B2, unbundle C1 and bundle C4 (FIG. 11D). In this way, balance criteria a) and b) are preserved, but c) is lost because ASA-C 102c has two bundled ports connected to switch-2 106 but none connected to switch-1 104, and ASA-B 102b has two bundled ports connected to switch-1 104 but no bundled ports connected to switch-2 106. However, this is already the best possible bundling balance with failure of both link B3 and link B4.

Another failure example is in the case of ASA-B 102b failing. In this case, a best recover is to bundle links A1, A2, A3, C1, C3, C4, D1 and D3. This bundling preserves all best bundle balance criteria except that ASA-D has one less bundled link than the other two units, ASA-A 102a and ASA-C 102c.

Bundle Rebalance when a Unit Joins and Leaves

When one cluster unit leaves the cluster or a new cluster unit joins the cluster, bundle balance redistributes bundled ports among all units so that the bundling is rebalanced in all three dimensions as much as possible. The behavior of bundle rebalance when the unit leaves is same or similar to as how unit failure is handled. The behavior of bundle rebalance when a unit joins is opposite of unit failure (i.e., some bundled ports on existing units move to a hot-standby state so that ports on new units can get bundled).

Least-Stop Forwarding During Recovery from a Cluster Master Leaving

One or more embodiments may provide for least-stop forwarding during recovery from a cluster master unit leaving a cluster and a new cluster master unit being elected. When a cluster master unit leaves a cluster (such as due to a failure of the master unit), port channels across the cluster will be updated only after a new master unit is selected. The slave units' links in the port channel will keep traffic forwarding using the old link aggregation status during this process to avoid traffic loss. In most cases, after recovery and a new master selected, no active link becomes hot-standby but old hot-standby links might become active after failure recovery. In such cases, data transmission on all slave units' links will not be interrupted. Only if a slave unit link transfers from an active link status to a standby link status after port channel re-aggregation (for example, due to load re-balancing) will this link will stop data forwarding. However, there should be some other link that replaces the link and takes its traffic load so that the load handover is smooth (i.e., a switch first stops forwarding traffic to it gracefully, then adds another link into the link aggregation and starts to forward traffic on it). Therefore, for slave units which remain in the cluster when the cluster master leaves, their data forwarding is least impacted, especially in a symmetric routing topology in which traffic on an old master unit does not impact traffic on slave units.

In such situations, in order to make the port channel re-aggregation occur quickly, it may be desirable to use the following configuration options within the cluster. The ASA unit which acts as a backup of the cluster master unit maintains and get updates about the link aggregation control protocol state machines of the whole cluster. When the master unit is still in the cluster, all state machine update may be forwarded from the master unit to the master backup unit or to multiple master backup unit if they are available. For each slave unit, after the master unit leaves and a new master unit completely becomes ready, the slave unit may sends all CLACP state updates to the backup master unit. Before any link aggregation result (active or hot-standby) change is received from the backup master unit, each slave unit may still transmit packets according to the old LACP state decided by old cluster master.

Note that in certain example implementations, the cluster link aggregation and bundle balancing functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 5] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 5] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, ASA 500 may include software in order to achieve the cluster link aggregation and bundle balancing functions outlined herein. These activities can be facilitated by cluster link aggregation control module 510 (where this module can be suitably combined in any appropriate manner with other modules, which may be based on particular configuration and/or provisioning needs). ASA 500 can include memory elements for storing information to be used in achieving the cluster link aggregation and bundle balancing activities, as discussed herein. Additionally, ASA 500 may include a processor that can execute software or an algorithm to perform the cluster link aggregation and bundle balancing operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the teachings of the present disclosure are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams or flow charts illustrate only some of the possible signaling scenarios and patterns that may be executed by, or within, the various embodiments described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, the teaching of the present disclosure may be applicable to other protocols and arrangements. Moreover, the present disclosure is equally applicable to various technologies, aside from DSL architectures, as these have only been offered for purposes of discussion. Along similar lines, the teachings of the present disclosure can be extended to any cluster or multi-chassis architecture.

One or more embodiments may provide one or more advantages over existing technologies. One advantage that may be offered by at least one embodiment is that it is compatible with standard LACP devices and standard LACP devices do not need to be aware of that a cluster operates with CLACP in order to inter-operate with a CLACP supported cluster. Another advantage that may be offered by at least one embodiment is that LACP is supported on multiple distributed units in one ASA cluster, and is superior to Multi-chassis EtherChannel (MEC) or Multi-chassis Link Aggregation Control Protocol (mLACP) which are limited to pairing two devices as one end of an Etherchannel. Still another advantage that may be offered by at least one embodiment is that it is generic for software implementation and beneficial for software reuse between products, which is hard to achieve for hardware based solutions. Still another advantage that may be offered by at least one embodiment is that it implements a distributed protocol that supports high availability, efficiency, and resilience. Still another advantage that may be offered by at least one embodiment is that it provides balanced port bundling thus load-balance between cluster members and even between switch peers in VSS/vPC connection to the cluster, which is not provided by existing solutions. Still another advantage that may be offered by at least one embodiment is that it is resilient to link or unit failure, and adaptive to unit joining and leaving.

What is claimed is:

1. A method, comprising:
    receiving a first request message from a first network element, the first request message including a request for at least one system parameter associated with a cluster that includes a plurality of clustered network elements;
    sending a first reply message to the first network element, the first reply message including the at least one system parameter associated with the cluster, wherein the at least one parameter includes a channel group identifier identifying a channel group associated with the cluster;
    receiving a second request message from the first network element using an out-of-band control link, the second request message including a request to bundle a first port associated with the first network element into the channel group associated with the cluster that includes the plurality of clustered network elements, wherein the second request message includes a unit identifier associated with the first network element, the channel group identifier, and a port identifier associated with the first port;

evaluating a port priority for the first port to determine a status of the first port with respect to the channel group; and sending a second reply message to the first network element, the second reply message indicating the determined status of the first port of the first network element, wherein the second reply message further includes the unit identifier, the channel group identifier, the port identifier, and the port priority of the first port and wherein the port priority is determinative of the status of the first port as being either bundled with the channel group or in a standby state.

2. The method of claim 1, further comprising: receiving an indication that the first port is non-operative over the out-of-band control link; and triggering a bundle balancing procedure in response to receiving the indication.

3. The method of claim 2, wherein the bundle balancing procedure includes sending an unselect message to a second network element of the plurality of clustered network elements using the out-of-band control link, the unselect message indicating to the second network element to change a status of a second port of the second network element from a bundled status to a standby status.

4. The method of claim 2, wherein the bundle balancing procedure includes sending a select message to the first network element using the out-of-band control link, the select message indicating to the first network element to change a status of third port of the first network element from a standby status to a bundled status.

5. The method of claim 1, wherein determining the status of the first port includes determining whether the status of the first port is bundled or in standby based on at least one of load balance within the cluster and maximum bundled port count.

6. The method of claim 1, wherein the out-of-band control link uses a cluster link aggregation protocol, the cluster link aggregation protocol including a standard link aggregation control protocol and a cluster specific link aggregation control protocol.

7. Logic encoded in one or more non-transitory tangible media that includes code for execution and when executed by a processor operable to perform operations comprising:

receiving a first request message from a first network element, the first request message including a request for at least one system parameter associated with a cluster that includes a plurality of clustered network elements;

sending a first reply message to the first network element, the first reply message including the at least one system parameter associated with the cluster, wherein the at least one parameter includes a channel group identifier identifying a channel group associated with the cluster;

receiving a second request message from the first network element using an out-of-band control link, the second request message including a request to bundle a first port associated with the first network element into the channel group associated with the cluster that includes the plurality of clustered network elements, wherein the second request message includes a unit identifier associated with the first network element, the channel group identifier, and a port identifier associated with the first port;

evaluating a port priority for the first port to determine a status of the first port with respect to the channel group; and sending a second reply message to the first network element, the second reply message indicating the determined status of the first port of the first network element, wherein the second reply message further includes the unit identifier, the channel group identifier, the port identifier, and the port priority of the first port and wherein the port priority is determinative of the status of the first port as being either bundled with the channel group or in a standby state.

8. The logic encoded in the one or more non-transitory tangible media of claim 7, wherein the operations further comprise:

receiving an indication that the first port is non-operative over the out-of-band control link; and triggering a bundle balancing procedure in response to receiving the indication.

9. The logic encoded in the one or more non-transitory tangible media of claim 8, wherein the bundle balancing procedure includes sending an unselect message to a second network element of the plurality of clustered network elements using the out-of-band control link, the unselect message indicating to the second network element to change a status of a second port of the second network element from a bundled status to a standby status.

10. The logic encoded in the one or more non-transitory tangible media of claim 8, wherein the bundle balancing procedure includes sending a select message to the first network element using the out-of-band control link, the select message indicating to the first network element to change a status of third port of the first network element from a standby status to a bundled status.

11. The logic encoded in the one or more non-transitory tangible media of claim 7, wherein determining the status of the first port includes determining whether the status of the first port is bundled or in standby based on at least one of load balance within the cluster and maximum bundled port count.

12. An apparatus, comprising: a memory element configured to store data; and a processor operable to execute instructions associated with the data, wherein the processor is configured to:

receive a first request message from a first network element, the first request message including a request for at least one system parameter associated with a cluster that includes a plurality of clustered network elements;

send a first reply message to the first network element, the first reply message including the at least one system parameter associated with the cluster, wherein the at least one parameter includes a channel group identifier identifying a channel group associated with the cluster;

receive a second request message from the first network element using an out-of-band control link, the second request message including a request to bundle a first port associated with the first network element into the channel group associated with the cluster that includes the plurality of clustered network elements, wherein the second request message includes a unit identifier associated with the first network element, the channel group identifier, and a port identifier associated with the first port;

evaluating a port priority for the first port to determine a status of the first port with respect to the channel group; and send a second reply message to the first network element, the second reply message indicating the determined status of the first port of the first network element, wherein the second reply message further includes the unit identifier, the channel group identifier, the port identifier, and the port priority of the first port and wherein the port priority is determinative of the status of the first port as being either bundled with the channel group or in a standby state.

13. The apparatus of claim 12, wherein the processor is further configured to:
  receive an indication that the first port is non-operative over the out-of-band control link; and trigger a bundle balancing procedure in response to receiving the indication.

14. The apparatus of claim 13, wherein the bundle balancing procedure includes sending an unselect message to a second network element of the plurality of clustered network elements using the out-of-band control link, the unselect message indicating to the second network element to change a status of a second port of the second network element from a bundled status to a standby status.

15. The apparatus of claim 13, wherein the bundle balancing procedure includes sending a select message to the first network element using the out-of-band control link, the select message indicating to the first network element to change a status of third port of the first network element from a standby status to a bundled status.

16. The apparatus of claim 12, wherein determining the status of the first port includes determining whether the status of the first port is bundled or in standby based on at least one of load balance within the cluster and maximum bundled port count.

\* \* \* \* \*